US008214632B2

(12) United States Patent
Choi et al.

(10) Patent No.: US 8,214,632 B2
(45) Date of Patent: Jul. 3, 2012

(54) METHOD OF BOOTING ELECTRONIC DEVICE AND METHOD OF AUTHENTICATING BOOT OF ELECTRONIC DEVICE

(75) Inventors: Yun-ho Choi, Seoul (KR); Choon-sik Jung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1081 days.

(21) Appl. No.: 11/964,270

(22) Filed: Dec. 26, 2007

(65) Prior Publication Data

US 2008/0215872 A1   Sep. 4, 2008

(30) Foreign Application Priority Data

Feb. 2, 2007   (KR) ........................ 10-2007-0011257

(51) Int. Cl.
*G06F 9/00*   (2006.01)
*G06F 15/177*   (2006.01)

(52) U.S. Cl. .................. 713/2; 380/44; 726/16; 726/17; 726/26; 711/102; 713/1; 713/181; 713/171; 714/6.31

(58) Field of Classification Search ...................... 726/16
See application file for complete search history.

(56) References Cited

U.S. PATENT DOCUMENTS

| | | | |
|---|---|---|---|
| 2003/0182570 A1* | 9/2003 | Dellow | 713/194 |
| 2003/0229777 A1* | 12/2003 | Morais et al. | 713/2 |
| 2004/0064457 A1* | 4/2004 | Zimmer et al. | 707/100 |
| 2004/0243862 A1* | 12/2004 | Ohishi et al. | 713/300 |
| 2005/0138409 A1* | 6/2005 | Sheriff et al. | 713/200 |

FOREIGN PATENT DOCUMENTS

| KR | 10-1999-0079740 A | 11/1999 |
|---|---|---|
| KR | 10-2006-0047897 A | 5/2006 |

OTHER PUBLICATIONS

Communication, dated Feb. 29, 2012, issued by the Korean Intellectual Property Office in corresponding Korean Application No. 10-2007-0011257.

* cited by examiner

*Primary Examiner* — Nathan Flynn
*Assistant Examiner* — Bryan Wright
(74) *Attorney, Agent, or Firm* — Sughrue Mion, PLLC

(57) ABSTRACT

Provided is a method of booting an electronic device including a host central processing unit (CPU) and a security module. The method includes: the host CPU starting to boot a system by using boot information in response to a reset or power on event of the electronic device; and when an authentication start instruction is not received by the security module from the host CPU until a first predetermined period elapses after an occurrence of the reset or power on event of the electronic device, controlling an operation of the host CPU by the security module. According to the method, when the authentication start instruction is received before the first predetermined period elapses, the security module authenticates the boot information and controls the operation of the host CPU based on an authentication result. A method of authenticating a boot of the electronic device in the security module is also provided.

20 Claims, 3 Drawing Sheets

METHOD OF BOOTING ELECTRONIC DEVICE AND METHOD OF AUTHENTICATING BOOT OF ELECTRONIC DEVICE

CROSS-REFERENCE TO RELATED PATENT APPLICATION

This application claims priority from Korean Patent Application No. 10-2007-0011257, filed on Feb. 2, 2007, in the Korean Intellectual Property Office, the disclosure of which is incorporated herein in its entirety by reference.

BACKGROUND OF THE INVENTION

1. Field of the Invention

Methods consistent with the present invention relate to a method of booting an electronic device and a method of authenticating a boot of the electronic device, and more particularly, to a method of securely booting an electronic device using boot information such as a boot code and an operating system (OS) image and a method of authenticating a boot of the electronic device.

2. Description of the Related Art

Recently, in order to increase security of a system in a multimedia system such as a home server, there is more need for a security device and a security method. As part of the security method, there is a secure boot method of booting a system only when an operating system (OS) image recorded in a non-volatile storage medium does not change. For example, the OS image stored in a non-volatile memory of a home server and an application program may be changed by an attacker, such as by using a hacking program, so that security of the system may be undermined. In this case, the secure boot method may be used. According to an existing secure boot method, after a basic input/output system (BIOS) or a boot loader copies the OS image in a random access memory (RAM), it is determined whether or not integrity of the OS image is preserved. Only when the integrity is determined to be preserved, is control of an electronic device handed over to a host central processing unit (CPU) or a host microprocessor. Therefore, the OS image changed by the attacker is not used for system booting.

However, in this method, only after an operation of checking the integrity of the OS image is finished, is the control of system handed over to the host CPU, so that there is a problem in that it may cause a delay in booting time. Moreover, a system having a large capacity OS image, such as a multimedia system and a server system, needs more time to check integrity, so that there is a problem in that the booting time of the system further increases.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An embodiment of the present invention provides a method of booting an electronic device, which is capable of separating and simultaneously performing authentication processing for checking integrity of boot information and booting of the electronic device.

The present invention also provides a method of authenticating boot information of an electric device performed by a security module which can be executed separately from the electronic device having the boot in format ion.

According to an aspect of the present invention, there is provided a method of booting an electronic device including a host Central Processing Unit (CPU) and a security module, the method including: starting to boot a system by using boot information by the host CPU in response to a reset or power on event of the electronic device; and when an authentication start instruction is not received by the security module from the host CPU until a first predetermined period elapses after an occurrence of the reset or power on event of the electronic device, controlling an operation of the host CPU by the security module.

The controlling of the operation of the host CPU by the security module may include: determining whether or not the authentication start instruction is received from the host CPU before the first predetermined period elapses after the occurrence of the reset or power on event of the electronic device by the security module; and when it is determined that the authentication start instruction is not received until the first predetermined period elapses, controlling the operation of the host CPU by the security module. The security module may stop an operation of the electronic device. Also, the security module may notify the host CPU about boot authentication failure by the security module before it stops the operation of the electronic device.

The method may further include when it is determined that the authentication start instruction is received before the first predetermined period elapses, authenticating the boot information by the security module; and controlling the operation of the host CPU by the security module based on a result of the authentication.

The controlling of the operation of the host CPU by the security module based on the result of the authentication may include stopping an operation of the electronic device by the security module when the boot information fails the authentication performed. The method may further include notifying the host CPU about boot authentication failure by the security module before stopping the operation of the electronic device.

According to another aspect of the present invention, there is provided a method of authenticating a boot of an electronic device in a security module, the method including: determining whether or not an authentication start instruction is received before a first predetermined period elapses after a boot start of the electronic device by the security module; and when it is determined that the authentication start instruction is not received until the first predetermined period elapses, controlling an operation of the electronic device by the security module.

The method may further include when it is determined that the authentication start instruction is not received until the first predetermined period elapses, determining whether or not a second predetermined period elapses after expiration of the first predetermined period by the security module; and when it is determined that the second predetermined period elapses, stopping the operation of the electronic device by the security module.

The method may further include notifying the electronic device about boot authentication failure by the security module when it is determined that the second predetermined period elapses.

The method may further include when it is determined that the authentication start instruction is received before the first predetermined period elapses, performing authentication of the boot information of the electronic device by the security module; and controlling the operation of the electronic device by the security module based on a result of the authentication.

The controlling of the operation of the electronic device by the security module based on the result of the authentication may include stopping the operation of the electronic device by the security module when the boot information fails the authentication.

The method may further include notifying the host CPU about boot authentication failure by the security module before stopping the operation of the electronic device.

The boot authentication failure may be represented by using at least one of a video signal and an audio signal.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENT OF THE PRESENT INVENTION

Hereinafter, exemplary embodiments of the present invention will be described in detail with reference to the attached drawings.

Figure 1:
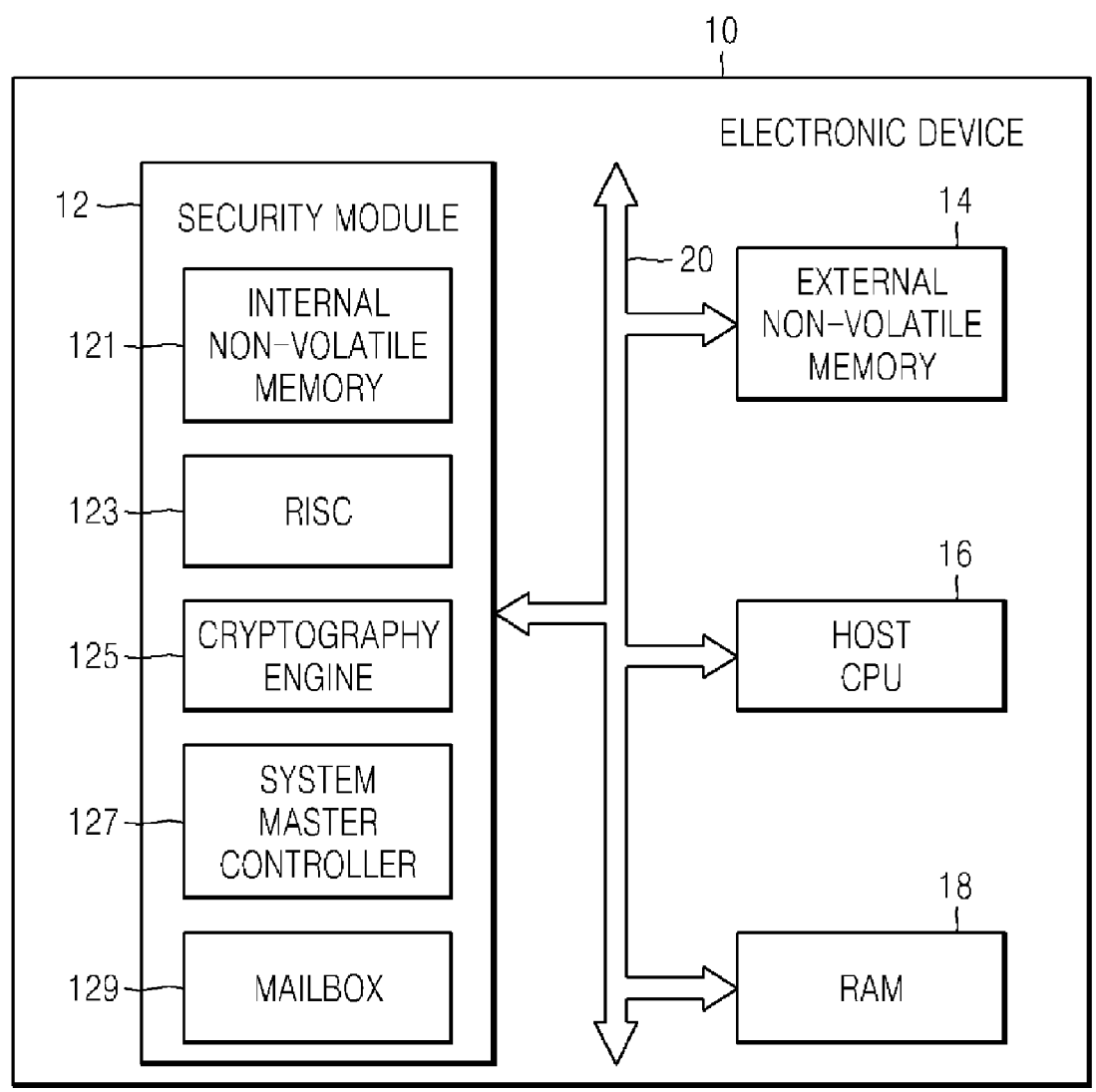
FIG. 1 is a block diagram of an electronic device having a secure boot function according to an exemplary embodiment of the present invention.

FIG. 1 is a block diagram of an electronic device 10 according to an exemplary embodiment of the present invention. The electronic device 10 includes a security module 12, an external non-volatile memory 14, a host microprocessor or a host central processing unit (CPU) 16, a random-access memory (RAM) 18, and a global bus 20. The security module 12, the external non-volatile memory 14, and the host CPU 16 communicate with each other via the global bus 20. The security module 12 and the host CPU 16 simultaneously operate when power to the electronic device is turned on.

The security module 12 includes an internal non-volatile memory 121, a reduced instruction set computer (RISC) 123, a cryptography engine 125, a system master controller 127, and a mailbox 129. The internal non-volatile memory 121 stores an authentication code, a public key, and a secret key. The authentication code is software for checking the integrity of a boot code, an operating system (OS) image, or an application. The public key and the secret key are used to authenticate an encrypted digital signature. The RISC 123 may execute the authentication code. The cryptography engine 125 provides hash functions used to execute an authentication process. For example, hash algorithms such as secure hash standard-1 (SHA-1), advanced encryption standard (AES), and rivest-shamir-adleman (RSA) may be provided from the cryptography engine 125. The system master controller 127 may compulsively control the host CPU 16 of the electronic device 10 when authentication fails. For example, the system master controller 127 may control reset of the electronic device 10 or a system clock by controlling the host CPU 16. The mailbox 129 may store an authentication start instruction, a position and a size of boot information to be authenticated, and the encrypted digital signature. The mailbox 129 is used to communicate with the host CPU 16. The mailbox is only an example, and it will be understood by one of ordinary skill in the art to which the present invention pertains that any communication unit having a function of communicating with the host CPU 16 may be used instead of the mailbox.

The external non-volatile memory 14 stores the boot code, the OS image, and the application code of the electronic device 10. The external non-volatile memory 14 also stores the encrypted digital signature obtained by encrypting the boot information. The boot information may include only parts of the boot code and the OS image. Alternatively, the boot information may include the boot code and the OS image. In addition, the boot information may further include the application code in addition to the boot code and the OS image. The boot code is software used for system booting of the electronic device, and the OS image is an operating system stored in a type of image. The application code is software such as an application program executed in the electronic device. More preferably, the application code is an application which is automatically started when booting an operating system, for example, an application program registered as a startup program of Windows. The digital signature may be generated by applying the boot information to the hash algorithm or the hash function. Therefore, the digital signature can be a predefined hash value obtained by applying the boot information to the hash function or the hash algorithm.

The host CPU 16 controls all the operations of the electronic device 10. However, the host CPU 16 does not control the security module 12 while the security module 12 executes operations associated with the authentication process.

Figure 2:
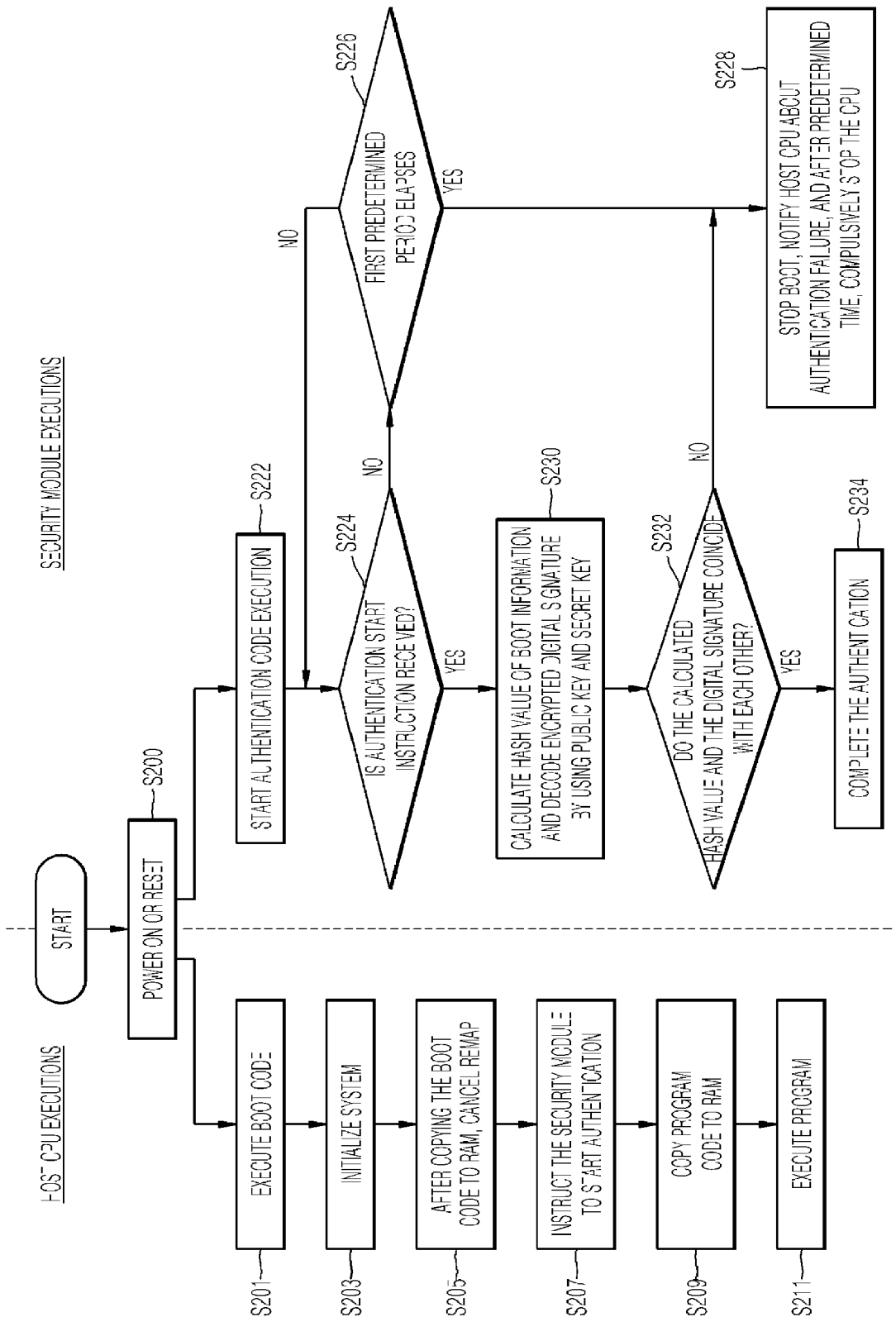
FIG. 2 is a flowchart of operations of the electronic device shown in FIG. 1.

FIG. 2 is a flowchart for explaining operations of the electronic device 10 shown in FIG. 1.

The electronic device 10 shown in FIG. 1 may be a personal computer, a server computer, a hand-held or laptop computer, a multiprocessor system, a microprocessor-based computer, a set top box, a programmable electronic device, a network PC, a minicomputer, a mainframe computer, or the like. An event of turning on or resetting the power of the electronic device 10 may be generated by manipulation of the electronic device 10 by a user (operation S200). In operation S200, when the power on or reset event occurs, the host CPU 16 starts to boot the system of the electronic device by using the boot code in response to the reset or power on event of the electronic device 10 (operation S201). In order to perform operation S201, the host CPU 16 remaps a memory address to a position of the boot code stored in the external non-volatile memory 14. When the boot code is executed in operation S201, components constructing the electronic device 10 are initialized (operation S203). Examples of the components are an input/output device, a user interface, a RAM, a phase locked loop (PLL), and the like. In operation S205, the host CPU 16 copies the boot code to the RAM 18 and cancels the remap in the RAM 18. The boot code copied to the RAM 18 may be used to load the OS image into the RAM 18.

In operation S207, the host CPU 16 transmits the authentication start instruction to the security module 12. The authentication start instruction is transmitted to the mailbox 129 in the security module 12. Alternatively, the authentication start instruction may be directly transmitted to the RISC 123 in the security module 12. The position and the size of the boot information stored in the external non-volatile memory 14 and the encrypted digital signature are transmitted to the security module 12 along with the authentication start instruction. In operation S209, the host CPU 16 copies a program code from the external non-volatile memory 14 to the RAM 18 by using the boot code existing in the RAM 18. More specifically, the host CPU 16 copies the OS image from the non-volatile memory 14 to the RAM 18 by using the boot code. Thereafter, the host CPU 16 boots the operating system by using the OS image on the RAM 18 (operation S211). When the booting of the operating system is completed in operation S211, the host CPU 16 retrieves an application code set to be automatically started when booting of the operating system is performed from the non-volatile memory 14 and executes the application code. As a result, the host CPU 16 can execute the system booting and application until an authentication result is received from the security module 12.

Meanwhile, in response to the reset or power on event of the electronic device 10, the RISC 123 in the security module 12 starts to execute authentication processing by using the authentication code stored in the internal non-volatile memory 121 (operation S222). Therefore, the authentication processing performed by the security module 12 can be simultaneously started with the system booting performed by the host CPU 16. The boot code stored in the external non-volatile memory 14 may be, for example, CPU execution software in a basic input/output system (BIOS) of an IBM PC.

When the authentication processing is started in operation S222, the RISC 123 determines whether or not the authentication start instruction is received from the host CPU 16 before a first predetermined period elapses after the occurrence of the reset or power on event of the electronic device 10. More specifically, the RISC 123 determines whether or not the authentication start instruction is received from the host CPU 16 (operation S224). In order to determine this, first, the RISC 123 inspects whether the authentication start instruction exists in the mailbox 129. In addition, the RISC 123 inspects whether data associated with the authentication of the system booting, that is, the position and size of the boot information and the encrypted digital signature, exist in the mailbox 129. In operation S224, if it is determined that the authentication start instruction is not received, the RISC 123 determines whether or not the first predetermined period elapses after the occurrence of the reset or power on event of the electronic device 10 (operation S226). For example, the first predetermined period is a period from the power on or reset of the electronic device 10 to completion of the system initialization. A loop including operations S224 and S226 is repeated until the first predetermined period elapses or the authentication start instruction is received by the security module 12 from the host CPU 16 before the first predetermined period elapses. The first predetermined period may be a system initialization period of the electronic device 10 or a longer period.

If it is determined that the first predetermined period elapses in operation S226, the RISC 123 performs a boot stop operation (operation S228). In operation S228, the RISC 123 controls the system master controller 127. The system master controller 127 then determines whether or not a second predetermined period elapses after the expiration of the first predetermined period. If it is determined that the second predetermined period elapses, the system master controller 127 compulsively stops the operation of the host CPU 16. Namely, the system master controller 127 controls the system of the electronic device 10 to stop. Before the RISC 123 stops the operation of the electronic device 10, the security module 12 may notify the host CPU 16 about boot authentication failure. For this, the RISC 123 may notify the host CPU 16 about the boot authentication failure during the second predetermined period. The notification about the boot authentication failure may include a warning message corresponding to the boot authentication failure. After the boot authentication failure notification is received, the host CPU 16, for example, suspends a current screen operation and displays the warning message on the screen, and after a predetermined time, the host CPU 16 reboots the electronic device 10 or suspends the screen while displaying the warning message. Alternatively, the user may be notified about the boot authentication failure by a sound.

If it is determined that the authentication start instruction is received in operation S224, the RISC 123 performs operation S230. Therefore, if the first predetermined period does not elapse when the authentication start instruction is received, the RISC 123 may perform operation S230. In operation S230, the RISC 123 calculates a hash value by using the boot information and decodes the encrypted digital signature by using the public key or the secret key. More specifically, when the authentication start instruction exists in the mailbox 129, the RISC 123 reads the position and the size of the boot information from the mailbox 129. Next, based on the position and the size of the read boot information, the RISC 123 obtains the boot information stored in the external non-volatile memory 14. Alternatively, the authentication start instruction may be directly transmitted from the host CPU 16 to the RISC 123 via the global bus 20. The RISC 123 generates the hash value from the boot information by controlling the cryptography engine 125. The hash function or the hash algorithm included in the cryptography engine 125 is used to calculate the hash value from the boot information. In addition, the RISC 123 obtains a digital signature from the encrypted digital signature by controlling the cryptography engine 125. In this case, the cryptography engine 125 obtains the digital signature by decoding the encrypted digital signature by using the public key and the secret key stored in the internal non-volatile memory 121.

In operation S232, the RISC 123 compares the calculated hash value with the digital signature. If the calculated hash value does not coincide with the digital signature, the RISC 123 determines that authentication of the system booting of the electronic device 10 fails and performs the boot stop operation in operation S228 again. In this case, the system master controller 127 controlled by the RISC 123 determines whether or not a third predetermined period elapses after a time in which it is determined whether the authentication failure of the system booting has occurred in operation S232. When it is determined that the third predetermined period elapses, the system master controller 127 controls the operation of the host CPU 16 to be compulsively stopped so that the system of the electronic device 10 is stopped. The RISC 123 may notify the host CPU 16 about the boot authentication failure during the third predetermined period. The notification about the boot authentication failure may include the warning message corresponding to the boot authentication failure.

In operation S228, the system master controller 127 may perform both the notification about the boot authentication failure and the compulsive stop of the operation of the host CPU 16. In this case, the warning message corresponding to the boot authentication failure may be transmitted from the system master controller 127 to the host CPU 16. Alternatively, the warning message corresponding to the boot authentication failure may not be provided by the system master controller 127 or the RISC 123, but instead, the electronic device 10 may have the warning message.

If it is determined that the calculated hash value coincides with the digital signature in operation S232, the RISC 123 determines that the boot authentication of the electronic device 10 succeeds and completes the authentication (operation S234). In this case, the RISC 123 may not transmit any information associated with an authentication result to the host CPU 16. Alternatively, in operation 234, the RISC 123 may notify the host CPU 16 about the successful boot authentication. Additionally, when the host CPU 16 receives a signal informing about the boot authentication success from the RISC 123, the host CPU 16 may be constructed to notify a user of the electronic device 10 about the success on-screen or by sound.

In the description above, the electronic device 10 includes the security module 12, the external non-volatile memory 14, the host CPU 16, and the RAM 18. The security module and the host CPU may be implemented in a single chip by using system on chip (SoC) technology. Alternatively, the security module may be constructed so as to be separated from other components that constitute the electronic device in FIG. 1. In other words, only the security module from among the components of the electronic device illustrated in FIG. 1 may be constructed as a separate product. Even in this case, the electronic device includes the non-volatile memory storing the boot code, the OS image, the application code, and the encrypted digital signature and the host CPU. An example of this construction is shown in FIG. 3.

Figure 3:
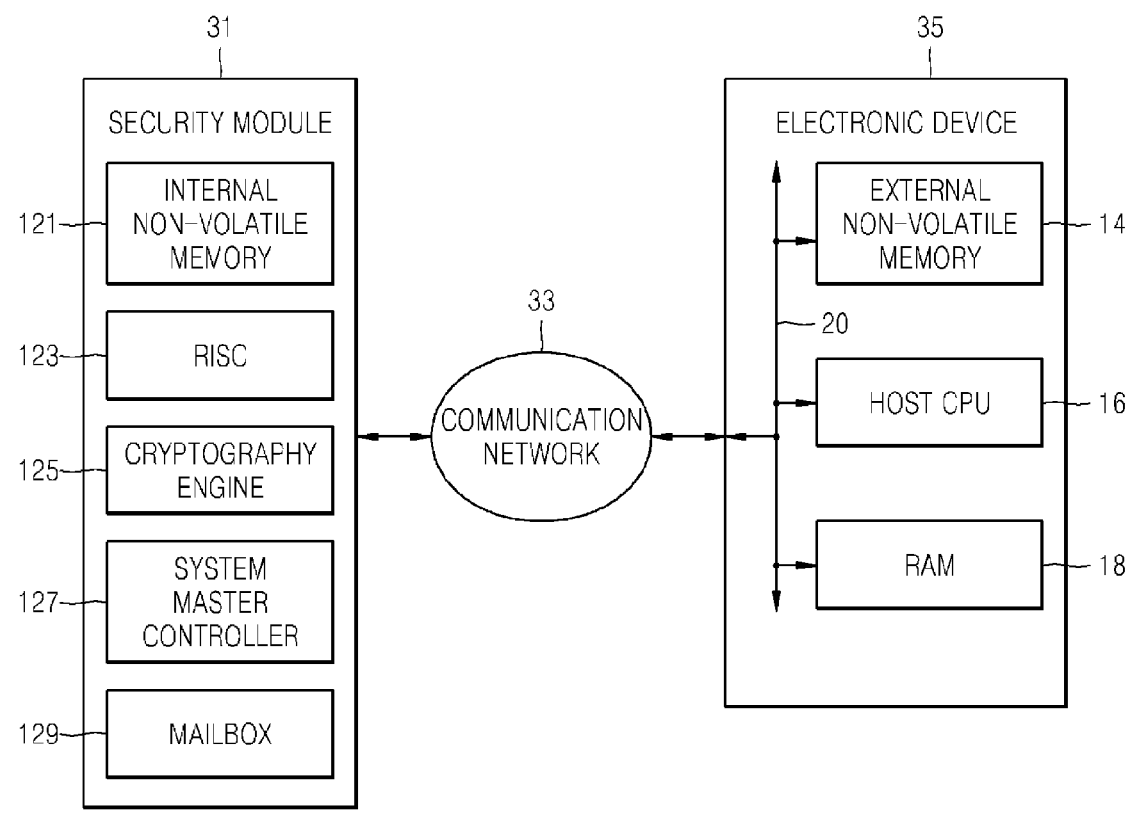
FIG. 3 is a block diagram of a system having a secure boot function according to another exemplary embodiment of the present invention.

FIG. 3 is a block diagram of a boot authentication system of an electronic device according to another exemplary embodiment of the present invention. Referring to FIG. 3, a security module 31 includes a non-volatile memory 121, an RISC 123, a cryptography engine 125, a system master controller 127, and a mailbox 129. An electronic unit 35 includes a non-volatile memory 14, a host CPU 16, and a RAM 18. The security module 31 may be a component separate from the electronic unit 35 in the electronic device. Alternatively, the security module 31 may be a stand-alone unit. For example, the security module 31 may be connected to the electronic unit 35 by a communication network 33 such as the Internet, an intranet, a wide area network (WAN), or a local area network (LAN). The components shown in FIG. 3 have substantially the same functions as those of the components having the same reference numerals shown in FIG. 1. However, when it is considered that the authentication start instruction of the host CPU 16 is transmitted via the communication network 33 to the security module 31, the host CPU 16 may need to transmit a boot start time of the electronic device and an occurrence time of the reset or power on event to the mailbox 129 of the security module 3 1, along with the authentication start instruction. Components of the security module 31 and components of the electronic unit 35 shown in FIG. 3 perform substantially the same functions as those of the electronic device illustrated in FIG. 2. Therefore, a detailed description will be omitted here.

As described above, according to the present invention, a waiting time of the host CPU may not be needed until the integrity of the system boot code and the OS image are checked. If the integrity of boot information such as the system code and the OS image is not guaranteed while booting, the security module can stop the electronic device which is operating by controlling the host CPU. Unlike the related art in which the host CPU executes an operating system after performing authentication to check the integrity, according to the present invention, the authentication processing and the operating system execution can be simultaneously performed. Accordingly, a disadvantage of a booting time delay due to the existing secure boot method can be overcome, and when the integrity is not guaranteed, the system is immediately stopped, so that the secure boot function can be maintained. Consequently, even though the secure boot is performed, the system booting performed by the host CPU and the boot authentication performed by the security module occur simultaneously, so that there is an advantage in that the booting process is faster than that in the existing secure boot method. Therefore, the booting time delay that is a problem of the existing secure boot system is solved, and the electronic device can be securely and rapidly booted.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of booting an electronic device including a host Central Processing Unit (CPU) and a security module, the method comprising:
   starting to boot a system by using boot information by the host CPU in response to a reset or a power on event of the electronic device;
   determining whether or not an authentication start instruction is received from the host CPU before a first predetermined period elapses after the occurrence of the reset or the power on event of the electronic device by the security module; and
   if the authentication start instruction is not received by the security module from the host CPU until the first predetermined period elapses after the occurrence of the reset or the power on event of the electronic device, controlling the host CPU by the security module,
   wherein the security module is operable to authenticate the boot information by obtaining the boot information from a non-volatile memory of the electronic device based on a position and a size of the boot information; and
   wherein the security module is operable to determine a success of a boot authentication of the electronic device by:
      calculating a hash value from the boot information by using a hash function;
      obtaining a digital signature by decoding an encrypted digital signature; and
      determining whether or not the calculated hash value and the obtained digital signature coincide with each other.

2. The method of claim 1, wherein in controlling the host CPU by the security module, boot authentication failure is displayed by using at least one of a video signal and an audio signal.

3. The method of claim 1, wherein controlling the host CPU by the security module further comprises:
   if it is determined that the authentication start instruction is not received until the first predetermined period elapses, determining whether or not a second predetermined period elapses after the first predetermined period by the security module; and
   wherein if it is determined that the second predetermined period elapses, stopping an operation of the electronic device by the security module.

4. The method of claim 3, wherein controlling the host CPU by the security module further comprises notifying the host CPU about boot authentication failure by the security module before stopping the operation of the electronic device.

5. The method of claim 1, further comprising:
   if it is determined that the authentication start instruction is received before the first predetermined period elapses, authenticating the boot information by the security module in a boot authentication; and
   controlling the host CPU by the security module based on a result of the boot authentication.

6. The method of claim 1, wherein the boot information comprises a boot code, an OS (operating system) image and an application code.

7. The method of claim 5, wherein controlling the host CPU by the security module based on a result of the boot authentication comprises stopping an operation of the electronic device by the security module if the boot information fails the boot authentication.

8. The method of claim 7, further comprising notifying the host CPU about boot authentication failure by the security module before stopping the operation of the electronic device.

9. A method of authenticating a boot of an electronic device in a security module, the method comprising:
   determining whether or not an authentication start instruction is received before a first predetermined period elapses after a boot start of the electronic device by the security module; and
   if it is determined that the authentication start instruction is not received until the first predetermined period elapses, controlling an operation of the electronic device by the security module,
   wherein the security module is operable to authenticate boot information by obtaining the boot information from a non-volatile memory of the electronic device based on a position and a size of the boot information; and
   wherein, the security module is operable to determine a success of a boot authentication of the electronic device by:
      calculating a hash value from the boot information by using a hash function;
      obtaining a digital signature by decoding an encrypted digital signature; and
      determining whether or not the calculated hash value and the obtained digital signature coincide with each other.

10. The method of claim 9, wherein in controlling the operation of the electronic device by the security module, boot authentication failure is displayed by using at least one of a video signal and an audio signal.

11. The method of claim 9, further comprising:
   if it is determined that the authentication start instruction is not received until the first predetermined period elapses,
   determining whether or not a second predetermined period elapses after the first predetermined period by the security module; and
   if it is determined that the second predetermined period elapses, stopping the operation of the electronic device by the security module.

12. The method of claim 11, wherein the first predetermined period is longer than a system initialization period of the electronic device.

13. The method of claim 12, further comprising:
   notifying the electronic device about boot authentication failure by the security module if it is determined that the second predetermined period elapses.

14. The method of claim 9, further comprising:
   if it is determined that the authentication start instruction is received before the first predetermined period elapses, performing authentication of the boot information of the electronic device by the security module in a boot authentication; and
   controlling the operation of the electronic device by the security module based on a result of the boot authentication.

15. The method of claim 9, wherein the boot information comprises a boot code, an OS image and an application code.

16. The method of claim 14, wherein controlling the operation of the electronic device by the security module based on the result of the boot authentication comprises stopping the operation of the electronic device by the security module if the boot information fails the boot authentication.

17. The method of claim 16, further comprising notifying the host CPU about the boot authentication failure by the security module before stopping the operation of the electronic device.

18. The method of claim 9, wherein the security module is separated from the electronic device.

19. The method of claim 1, wherein the security module controls the operation of the host CPU by a communication network.

20. The method of claim 1, wherein the security module is operable to perform a stop operation and issue a failure notification in the event of a boot information authentication failure or the receipt of the authentication start instruction after the second predetermined period elapses.

* * * * *